United States Patent [19]

Weirich et al.

[11] 4,048,866
[45] Sept. 20, 1977

[54] APPARATUS FOR USE IN CONTROLLING THE TENSION OF A CHAIN OR CHAINS OF MINING EQUIPMENT

[75] Inventors: Walter Weirich, Dortmund; Willy Kussel, Altlunen, both of Germany

[73] Assignee: Gewerkschaft Eisenhutte Westfalia, Westfalia, Germany

[21] Appl. No.: 713,537

[22] Filed: Aug. 11, 1976

[30] Foreign Application Priority Data

Aug. 14, 1975 Germany .............................. 2536258

[51] Int. Cl.$^2$ ............................................. F16H 7/12
[52] U.S. Cl. ............................................. 74/242.1 FP
[58] Field of Search .............. 74/242.1 FP, 242.1 TA, 74/242.8, 242.9

[56] References Cited

U.S. PATENT DOCUMENTS

| | | | |
|---|---|---|---|
| 2,610,517 | 9/1952 | Hornbostel ................... | 74/242.1 FP |
| 3,647,270 | 3/1972 | Althaus ....................... | 74/242.1 FP |
| 3,950,031 | 4/1976 | Krekeler ...................... | 74/242.1 FP |
| 4,007,826 | 2/1977 | Brown, Jr. et al. ...... | 74/242.1 FP X |

FOREIGN PATENT DOCUMENTS 1,007,634   5/1957   Germany ...................... 74/242.1 FP Primary Examiner—Leonard H. Gerin
Attorney, Agent, or Firm—Thompson, Birch, Gauthier & Samuels

[57] ABSTRACT

Chain-tension control apparatus for use with mine installations utilizes a hydraulic multi-piston engine motor driving a reduction gearing which can be selectively coupled to a drive system for a chain or chains used in the installation. The motive fluid for the motor is derived from the main pressure fluid source supplying fluid to other components of the installation and is preferably a 2–5% oil in water emulsion supplied via a pressure-reducing device. Pipe means in the form of a siphon conveys waste fluid as an overflow back to a storage tank independently of the main flow and return lines to the motor and the pipe means provides a fluid trap to maintain a certain quantity of fluid in the motor at all times.

9 Claims, 2 Drawing Figures

APPARATUS FOR USE IN CONTROLLING THE TENSION OF A CHAIN OR CHAINS OF MINING EQUIPMENT

BACKGROUND OF THE INVENTION

The present invention relates to apparatus for use in controlling the tension of a chain or chains of mining equipment.

As is known, the so-called tension control apparatus is employed where it is desired to tighten or slacken or merely support a chain or chains of equipment such as a scraper-chain conveyor and/or a winning machine, such as a plough, during installation or repair work, for example.

Such apparatus can be built on to the main drive assembly for the chain or chains so as to be capable of being coupled to the drive to operate the latter at a much reduced speed. Normally such apparatus has a motor connected through reduction gearing to a pinion or the like which can be selectively coupled to the drive. One form of known apparatus is described in German Patent specification No. 2063695. This known apparatus utilizes, in a preferred construction, a compressed air motor which is particularly suitable for smooth control of the chain tension.

A general object of this invention is to provide an improved apparatus.

SUMMARY OF THE INVENTION

According to the invention there is provided apparatus for use in controlling the tension of a chain or chains of mining equipment; said apparatus comprising a hydraulic motor for driving reduction gearing means adapted to be selectively coupled to a drive of the chain or chains, the hydraulic motor being operated with an oil-water emulsion as motive fluid and means forming a fluid trap to maintain fluid in the interior of the motor.

The invention also provides apparatus for use in controlling the tension of a chain or chains of mining equipment, said apparatus comprising a hydraulic motor for driving reduction gearing means adapted to be selectively coupled to a drive of the chain or chains, the hydraulic motor being operated with an oil-water emulsion as motive fluid and pipe means forming a fluid trap to maintain fluid in the interior of the motor.

The fluid for driving the hydraulic motor can in accordance with the invention, be taken or derived from the main pressure fluid source available for supplying fluid to the various fluid driven components, such as props and rams, in the mine working. A preferred fluid is a 2-5% oil in water emulsion.

The hydraulic motor, which is preferably a multi-piston motor, may also act as a brake for the chain drive and a valve assembly which may be manually operated by way of a lever, can be provided to regulate the fluid fed to the motor. The provision of a plurality of small diameter pistons in the motor is useful in ensuring minimal loss or leakage of fluid when the tensioned chain is being supported.

In its simplest form the trap-forming means can be a standpipe arranged as a siphon and serving as part of an overflow line quite independent of the fluid return line of the motor. The standpipe can then extend above the motor and its gearing means so that the waste fluid spaces in the motor are located below the waste fluid level of the overflow line. The overflow line can be connected back to a main fluid reservoir or tank storing fluid for a pump serving at the source supplying the pressure fluid for the mine installation. A pressure reducing device is preferably connected between the pump and the motor or its valve assembly.

The hydraulic motor is preferably operated as an engine running at a normal speed. This precludes the formation of reversing pressure heads which occur with a slow running engine and precludes the high transmission losses which occur with a high speed engine. The maintenance of fluid in the motor inhibits corrosive effects.

In a practical construction the pressure-reducing device, the valve assembly and the motor can be combined in a compact unit supported by a drive assembly of the equipment employing the chain or chains. A bracket-like support which carries the motor on its underside and acts as a cover therefor may be provided on the drive assembly and the valve assembly and possibly the pressure-reducing device may then be located on the upperside of the support.

Pipe lines or conduits can be connected to the motor by way of the valve assembly to convey the fluid to and from the motor and it is advisable to incorporate one or more non-return valves to preclude fluid loss and sudden relaxation in the event of fracture of any of the fluid lines.

As will become apparent hereafter, the invention also provides apparatus for controlling the tension in a chain of mining equipment driven with a drive system; said apparatus comprising a gearing unit providing a reduction ratio and having an output drive, means for selectively coupling the output drive of the gearing unit to the drive system for the chain, a multi-piston hydraulic motor for driving the gearing unit, means for providing an oil-water emulsion as motive fluid for operating the motor and a pipe connected with the interior of the motor and extending above the motor to form a fluid trap to maintain fluid inside the motor.

The invention may be understood more readily, and various other aspects of the invention may become apparent, from consideration of the following description.

BRIEF DESCRIPTION OF DRAWINGS

An embodiment of the invention will now be described, by way of example only, with reference to the accompanying drawings, wherein.

DESCRIPTION OF PREFERRED EMBODIMENT

Figure 1:
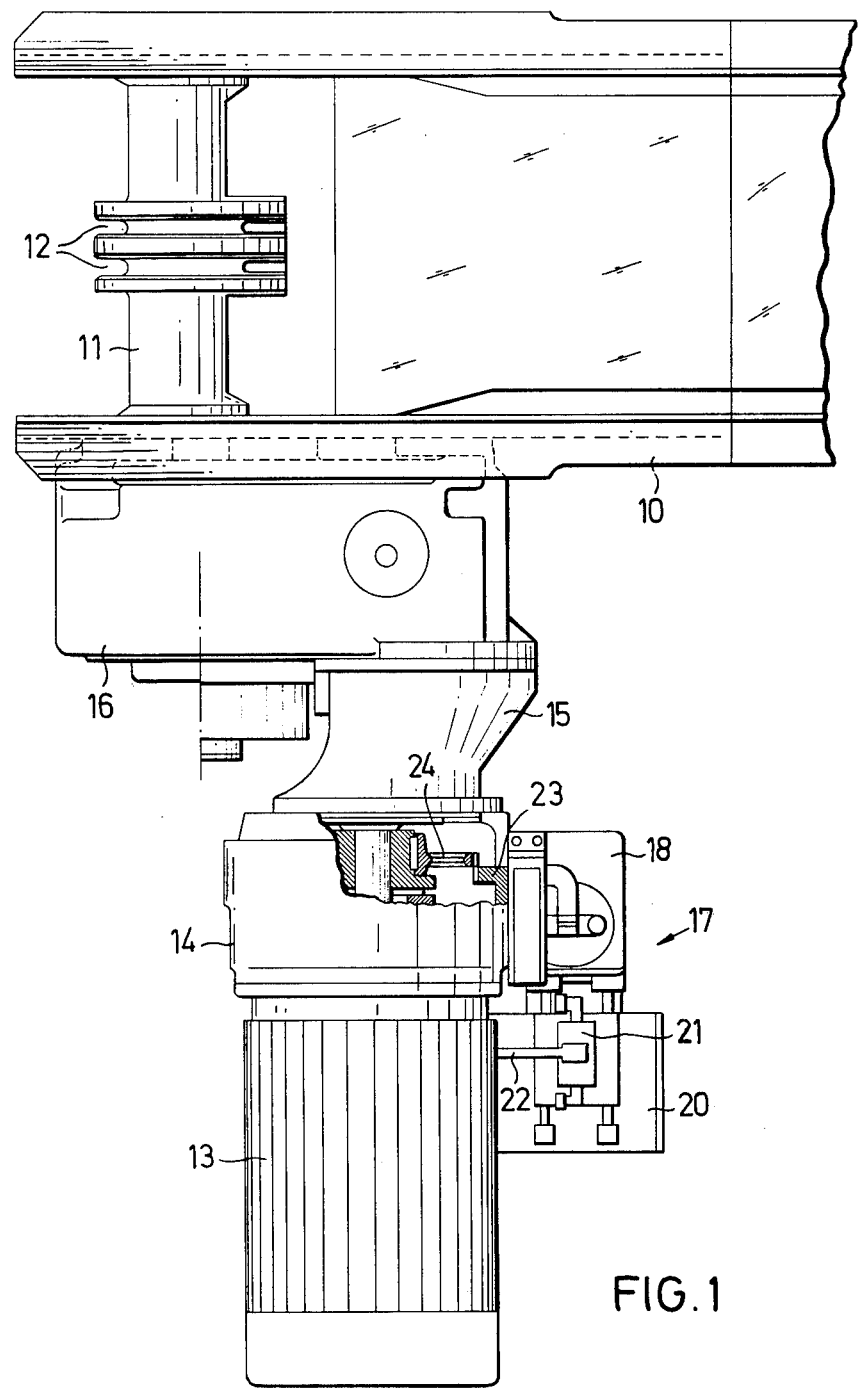
FIG. 1 is a schematic plan view of a drive assembly or station of a scraper-chain conveyor employing chain tension control apparatus made in accordance with the invention.

As shown in FIG. 1, a scraper-chain conveyor installed in a mine working and used to transport mineral has a drive station with a frame 10 at one end. The frame 10 has parallel side walls between which a chain drum 11 is rotatably mounted. The drum is provided with sprockets 12 which engage with an endless scraper-chain assembly (not shown) circulated along the channel sections of the conveyor. The scraper-chain assembly may employ a single or a double chain. Drive means is provided for driving the drum 11 and hence the scraper-chain assembly.

The drive means is composed of an electric motor 13 which is drivably coupled to the drum 11 via a coupling unit 14 and gearing units 15,16. The gearing unit 16, which forms the main gearing unit, is connected via interengaging flanges to the side wall of the frame 10. Although the drive has been illustrated solely for the scraper-chain assembly it is possible to drive the chain wheel of a plough or some other mineral winning machine or a loading machine independently or simultaneously. The tension control apparatus can also be used with other drive systems.

The tension control apparatus made in accordance with the invention is generally designated 17 in FIG. 1 and is constructionally united with the drive means. The apparatus 17 is composed of a gearing unit 18 having a housing attached to the housing of the coupling unit 14 and a hydraulic motor 19 (FIG. 2) with a control valve assembly 21 carried by a support 20. The motor 19 located on the underside of the support 20 serves to transmit drive to the unit 18 which provides a high step-down or reduction ratio. The output from the unit 18 comprises a pinion 23 which can be adjusted by a manually-operated device to engage with or disengage from a ratchet wheel 24 drivably engaging with the drive transmission of the unit 14. The valve assembly 21 has a manually-operable lever 22 which serves to regulate and control the fluid fed to and from the motor 19 in a manner such that the speed and rotational direction of the motor 19 can be varied.

The general principle of operation of the tension apparatus 17 is well known per se. Thus, when the pinion 23 engages with the wheel 24 the motor 13 is rendered inoperative and the motor 19 then drives the gearing units 14,15 via the unit 18 at a much reduced speed. The drum 11 can thus be partly rotated in either direction at much reduced speed to adjust the tension in the scraper-chain assembly or else held or supported in a more or less stationary position to enable various repair or installation operations to be performed. Similar adjustment can take place with the machine or plough drive chain where employed. The apparatus 17 would normally be used where the conveyor is to be shortened or lengthened or where the chain tension or length is to be varied or where a broken chain is to be repaired.

Figure 2:
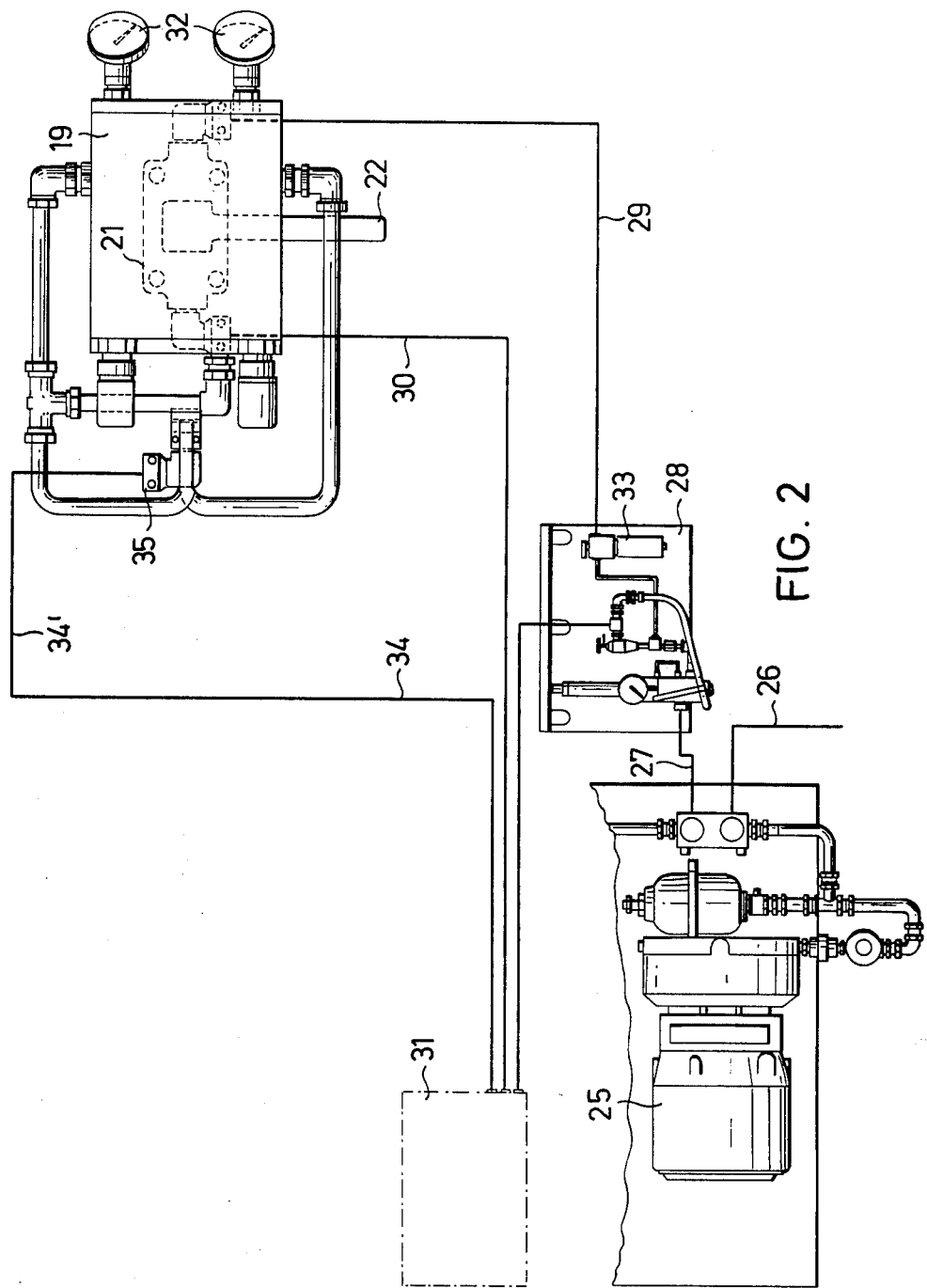
FIG. 2 is a diagrammatic representation of the chain tension control apparatus.

Referring now to FIG. 2, the motor 19 is a multi-piston engine motor operated with a 2–5% oil in water emulsion as its motive fluid. The fluid for driving the motor 19 is taken from the normal pressure fluid supply feeding the other fluid-consuming apparatus, such as rams and props, in the mine working. The pressure fluid for the working is provided by a pump 25 which feeds a main pressure fluid line 26 leading to the other apparatus and a further line 27 which feeds a pressure reducing arrangement 28. This arrangement 28 feeds fluid at reduced pressure to the assembly 21 by way of a line 29, and a filter 33 is incorporated in the line 29. The pressure of the fluid operating the motor 19 can be monitored with gauges 32 and ranges between 30-80 bar. The fluid discharged from the motor 19 passes through the valve assembly 21 to a return line 30 which leads back to a reservoir or storage tank 31. A line also connects the arrangement 28 to the tank 31.

In accordance with the invention a sufficient proportion of fluid is maintained in the motor to preclude corrosive damage. To this end the interior of the motor 19 containing waste fluid is connected to an outlet 35 which leads to an overflow line 34 via a standpipe section 34' extending above the motor 19 in the manner of a siphon thereby producing a fluid trap. The line 34 is connected back to the tank 31. The provision of the fluid trap ensures that waste fluid cannot flow freely from the motor 19 but is retained so that the motor 19 is constantly filled with fluid.

Although the pressure-reducing arrangement 28 has been represented in FIG. 2 as separate from the motor 19 and the valve assembly 21, in a practical construction it is advantageous to combine these components as one construction unit carried by the support 20.

Preferably one or more of the fluid lines incorporate non-return valves to preclude sudden relaxation of the support or tension force and fluid loss in the event of fracture of the hose or conduit constituting the fluid line.

The apparatus as described enables sensitive reliable and safe control of the tension of the chain or chains of the installation whenever desired. Moreover any variation of tension can be accomplished smoothly thereby preventing undue wear of the chain or chains and components of the drive system.

We claim:

1. In apparatus for use in controlling the tension of a chain or chains of mining equipment, said apparatus comprising a hydraulic motor driving reduction gearing means which can be selectively coupled to a drive for the chain or chains; the improvements comprising utilizing an oil-water emulsion as motive fluid for the motor and providing means forming a fluid trap to maintain fluid within the interior of the motor.

2. In apparatus for use in controlling the tension of a chain or chains of mining equipment, said apparatus comprising a hydraulic motor driving reduction gearing means which can be selectively coupled to a drive for the chain or chains; the improvements comprising utilizing an oil-water emulsion as motive fluid for the motor and providing pipe means forming a fluid trap to maintain fluid within the interior of the motor.

3. Apparatus according to claim 1, wherein there is further provided a manually-operable valve assembly for regulating the fluid fed to the motor.

4. Apparatus according to claim 1, wherein pipe lines serve to convey the motive fluid to and from the motor and the trap-forming means comprises a further separate pipe line.

5. Apparatus according to claim 1, wherein the trap-forming means comprises a standpipe forming part of a siphon like overflow pipe line.

6. Apparatus according to claim 5, wherein the overflow pipe line is connected to a fluid storage tank and the motive fluid for the motor is derived from a pump source supplying pressure fluid to other equipment in a mine installation.

7. Apparatus according to claim 6, wherein the pipe line conveying fluid from the motor is connected to said tank and a pressure reducing device is operably connected between the pump source and the motor.

8. Apparatus according to claim 1, wherein the motor is a multi-piston engine motor.

9. Apparatus for controlling the tension in a chain of mining equipment driven with a drive system; said apparatus comprising a gearing unit providing a reduction ratio and having an output drive, means for selectively coupling the output drive of the gearing unit to the drive system for the chain, a multi-piston hydraulic motor for driving the gearing unit, means for providing an oil-water emulsion as motive fluid for operating the motor and a pipe connected with the interior of the motor and extending above the motor to form a fluid trap to maintain fluid inside the motor.

* * * * *